(12) United States Patent
Brotzel

(10) Patent No.: US 7,478,973 B2
(45) Date of Patent: Jan. 20, 2009

(54) CONCRETE-LEVELING SYSTEM

(75) Inventor: Norman Brotzel, Falkland (CA)

(73) Assignee: Precise Tech Industries Ltd., Westbank, British Columbia (CA)

( * ) Notice: Subject to any disclaimer, the term of this patent is extended or adjusted under 35 U.S.C. 154(b) by 145 days.

(21) Appl. No.: 11/679,641

(22) Filed: Feb. 27, 2007

(65) Prior Publication Data

US 2007/0206991 A1    Sep. 6, 2007

(30) Foreign Application Priority Data

Mar. 1, 2006   (CA) .................................. 2538272

(51) Int. Cl.
*E01C 19/22* (2006.01)
(52) U.S. Cl. ..................................... 404/118
(58) Field of Classification Search .................. 404/118
See application file for complete search history.

(56) References Cited

U.S. PATENT DOCUMENTS

| | | | |
|---|---|---|---|
| 4,752,156 | A | 6/1988 | Owens |
| 5,288,166 | A | 2/1994 | Allen et al. |
| 6,089,787 | A | 7/2000 | Allen et al. |
| 6,758,631 | B2 | 7/2004 | Frankeny, II |

*Primary Examiner*—Raymond W Addie
(74) *Attorney, Agent, or Firm*—Dennis T. Griggs

(57) ABSTRACT

A leveling system for freshly poured concrete is provided comprising a hand screed and a hand float. The system includes a laser beam leveling system consisting of a laser transmitter mounted on the hand screed and a laser beam receiver target mounted on the hand float. The hand screed further includes an inclinometer mounted on top of the hand screed for maintaining the angle of the screed when the screed is used on sloped surfaces. Bubble levelers positioned on top of the hand screed and the hand float are used to maintain the hand screed and the hand float in a level position.

24 Claims, 9 Drawing Sheets

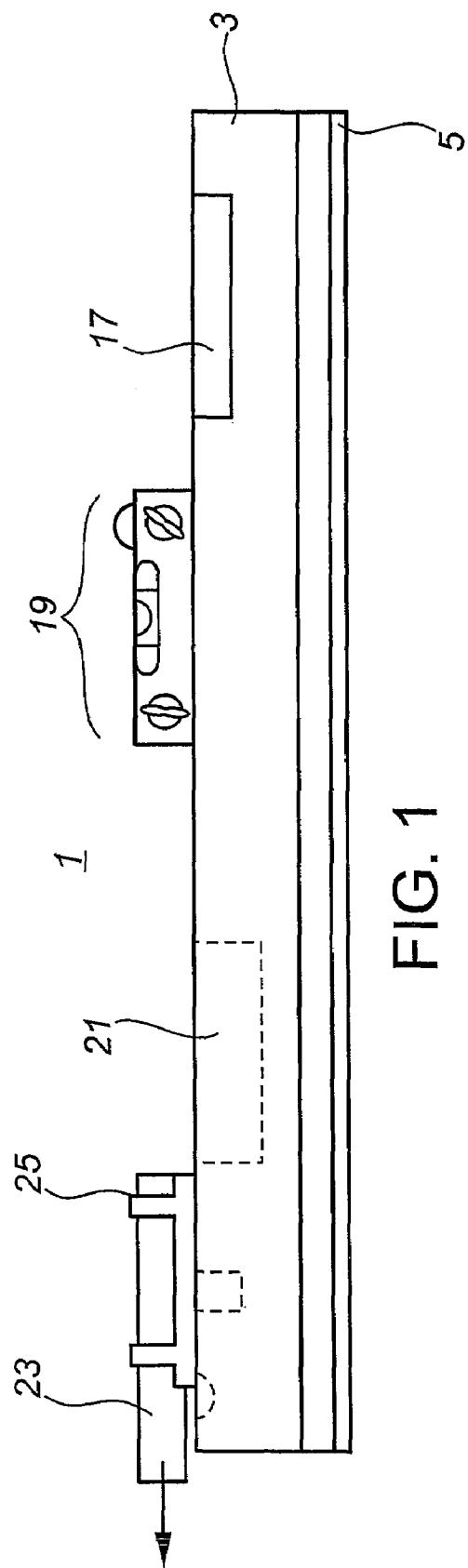
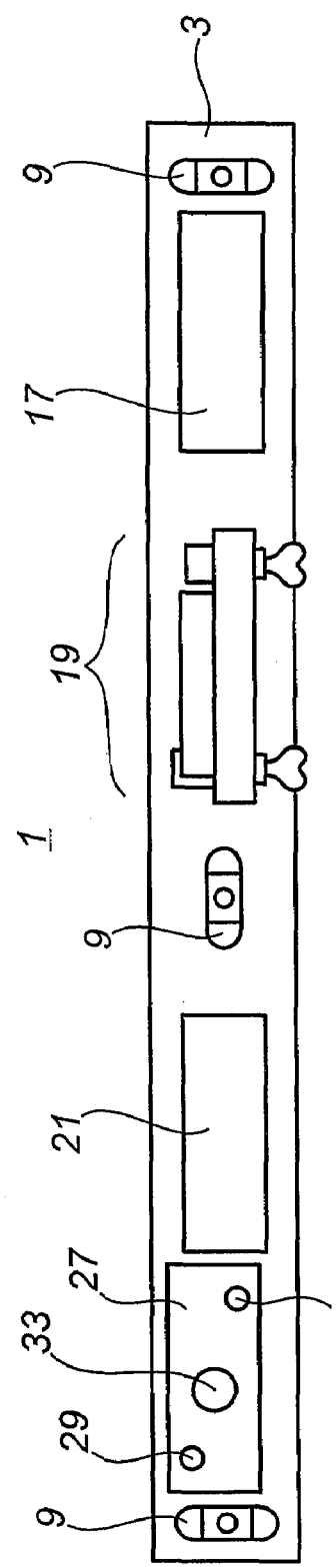
FIG. 1
FIG. 2

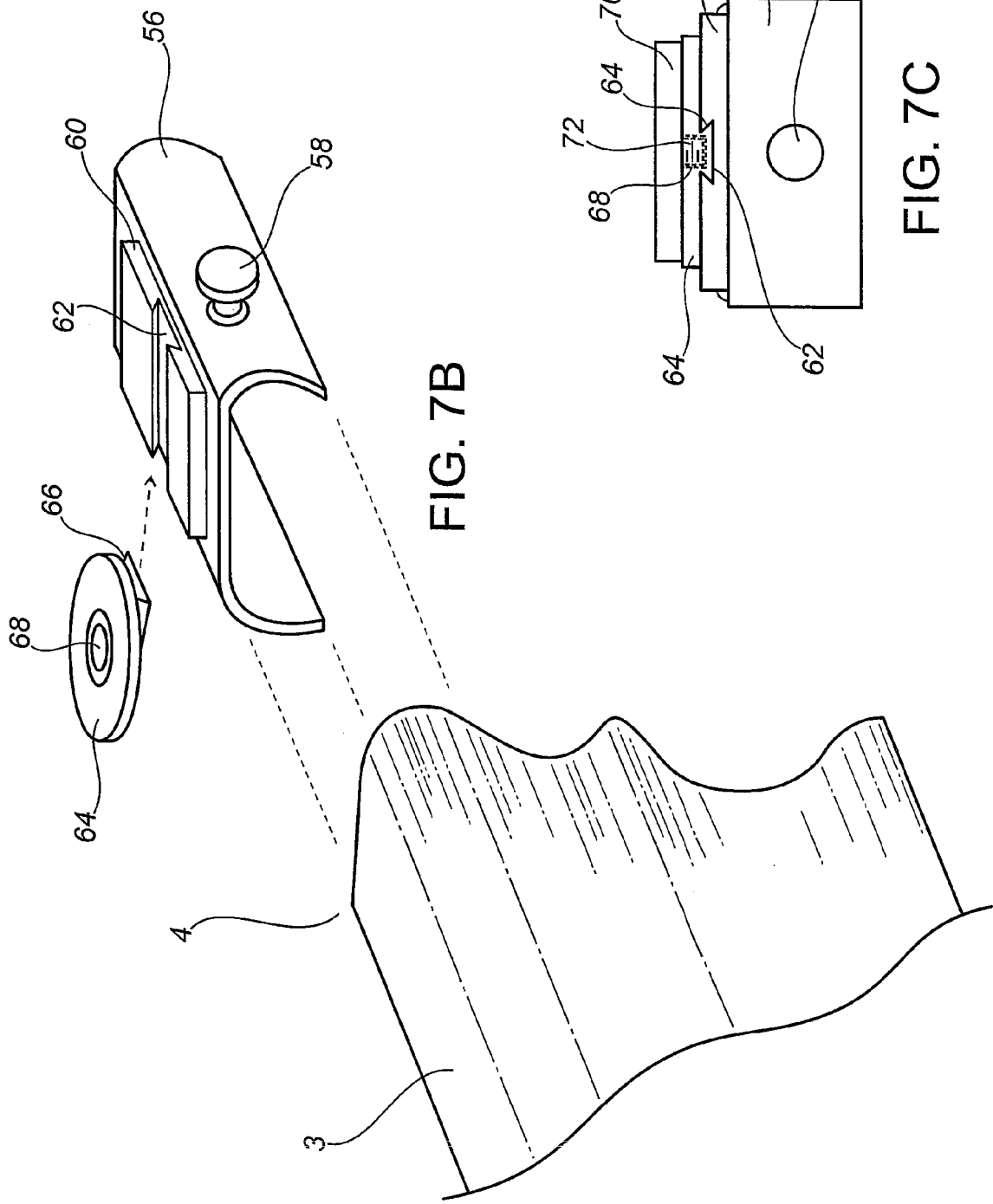

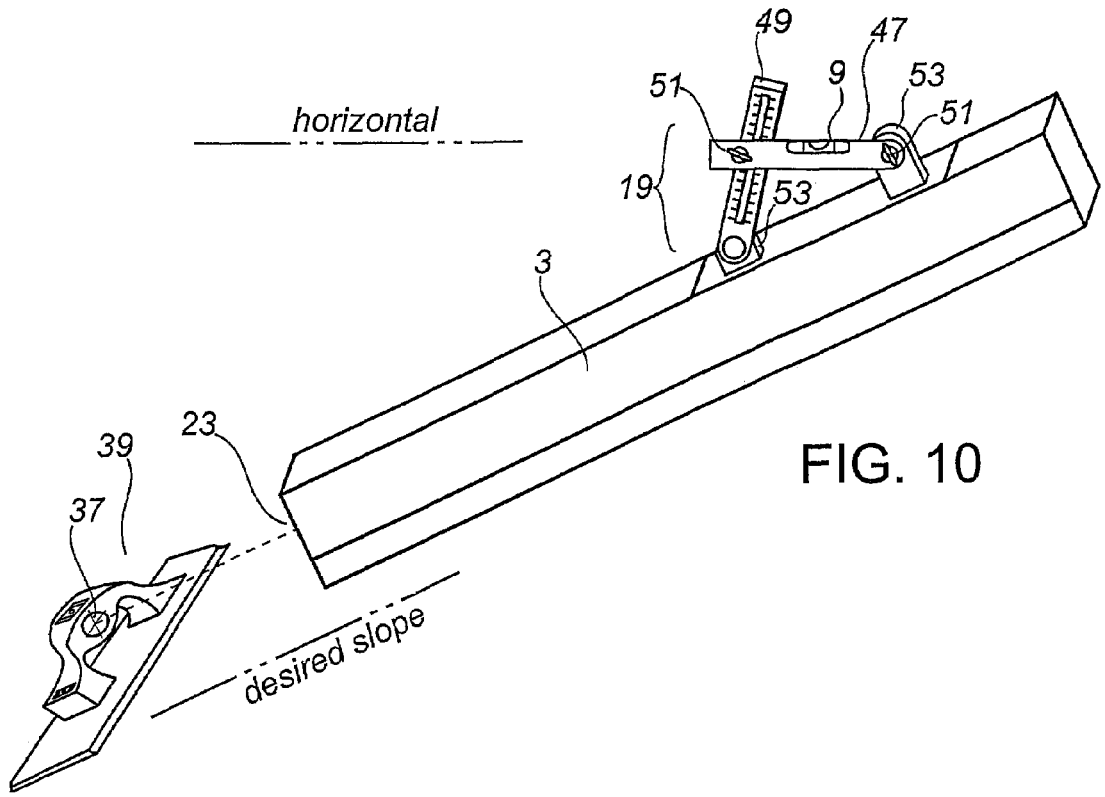
FIG. 10
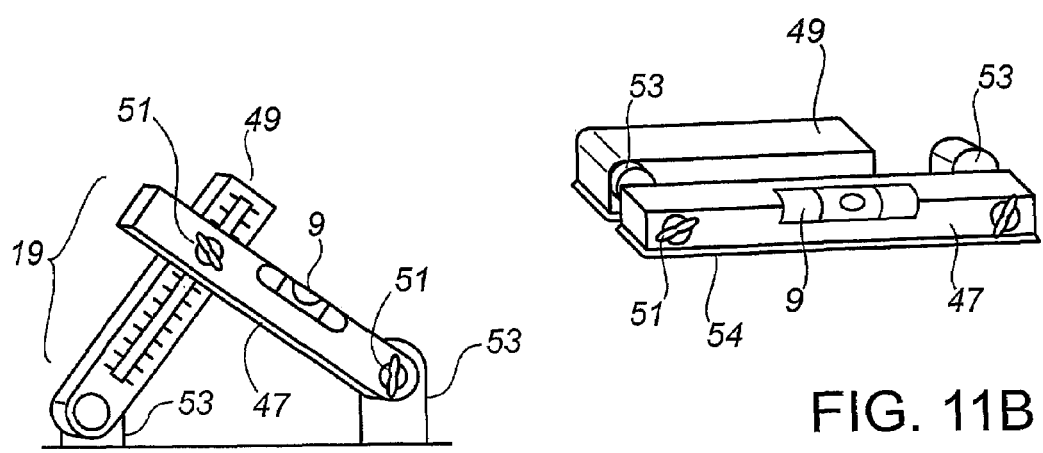
FIG. 11A
FIG. 11B

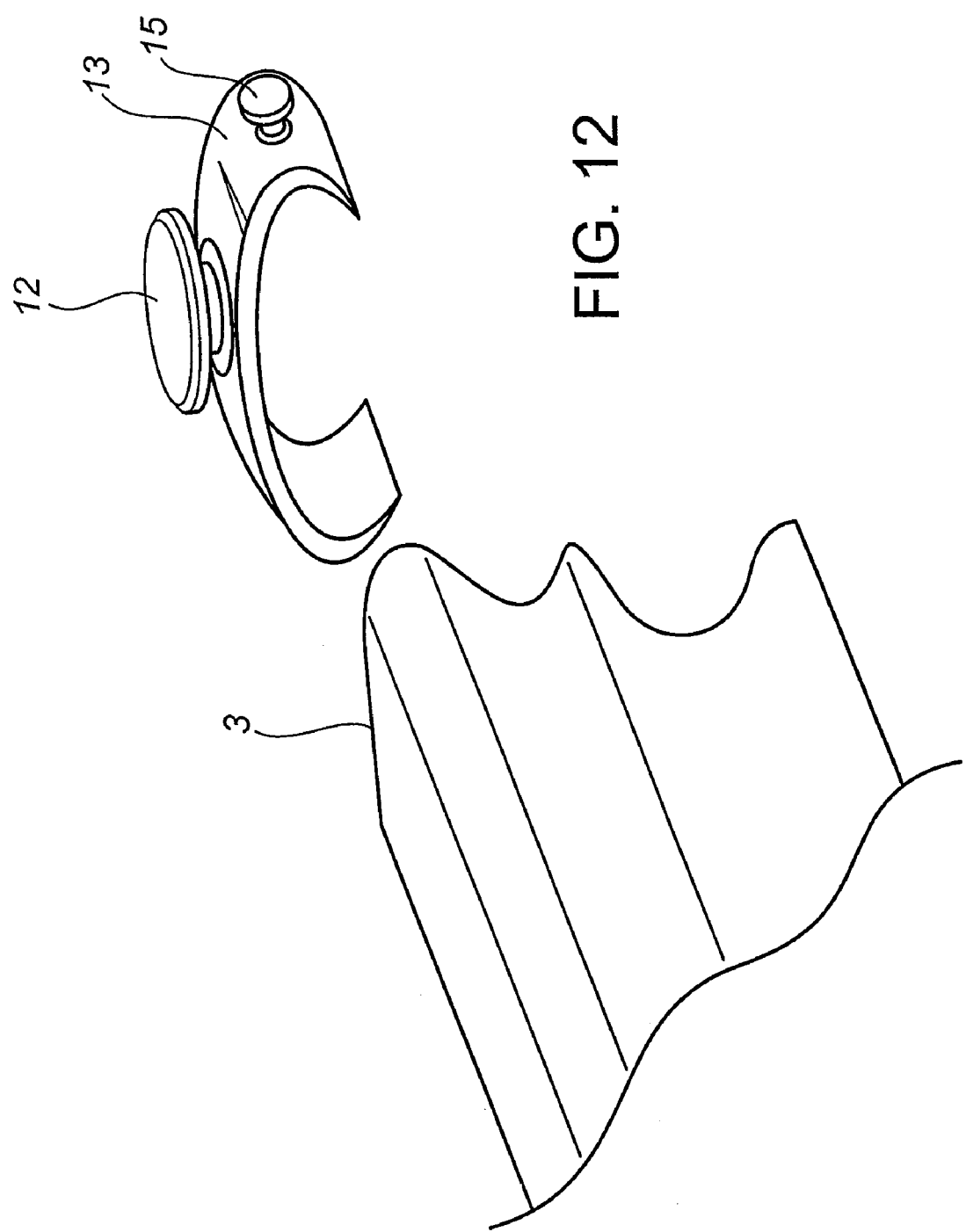

CONCRETE-LEVELING SYSTEM

FIELD OF THE INVENTION

The present invention relates to concrete construction, including concrete finishing, handling and leveling. More specifically, the present invention relates to tools for leveling fresh concrete after it has been poured.

BACKGROUND OF THE INVENTION

In the concrete industry, "screeding-boards" are common tools used to level concrete that has been freshly poured. For the purposes of this specification and the claims contained herein, the term "plastic concrete" shall refer to freshly-poured concrete that has not yet set up and hardened.

The types of screeds used in leveling plastic concrete vary from a 2×4 plank of wood, which is manually pushed or pulled through the concrete to a mechanical screed, which is gas and occasionally electrically powered. Often, the type of screed used depends upon the size and complexity of the surface area to be leveled. Conventional manual and power screeds have their distinct problems.

Power screeds are commonly used only for larger spaces and lack the versatility required to screed concrete in smaller spaces, such as doorframes, concrete pedestals, or floors with pipes and/or trenches. Mechanical screeds are often too expensive and bulky for the average individual to use (such as in a home-renovation project).

Manual screeds continue to be used in the majority of concrete projects. Manual screeds are necessarily used for small surface areas, slopes and around difficult spaces such as drains and columns. However, manual screeds are labourious to use and difficult to maneuver through the concrete. Manual screeds are also problematic due to difficulties in consistently and accurately maintaining the screed level throughout the screeding process.

The conventional method of guiding manual screeds is relatively inaccurate. Manual screed operators usually use string lines and, in large commercial projects, perhaps a laser leveling system to create reference guides in the plastic concrete and then attempt to move the screed blade on the guides to produce a flat and level floor. The laser leveling system usually comprises a reference laser and a laser receiver mounted on a post. Once the receiver is leveled relative to the reference laser, the foot of the post is at the desired concrete height. The post is then used to establish guide pins in the plastic concrete indicating the desired concrete height. The concrete is screeded using these guides.

Various attempts have been made to increase the accuracy of portable screeds by attaching a component of the laser leveling system directly to the portable screed. These are discussed below.

U.S. Pat. No. 4,752,156 provides a portable screed comprising: a stationary laser projector, which is separate from the screed, and a laser receiver, which is adjustably mounted on to the screed itself. The receiver can be vertically adjusted to receive the signal at different heights. The screed also contains a sight-level included on the screed for leveling of the entire screed. However, this reference fails to teach the use of an inclinometer for screeding sloped surfaces at different angles because the laser transmitter is stationary.

U.S. Pat. No. 5,288,166 involves a laser-operated automatic grade control system, having a laser projector and a laser receiver, which automatically detects elevation relative to the laser and adjusts the height of the finishing tool via an adjustable hydraulic cylinder. However, the system taught by this reference is too large to be used on sloped surfaces.

U.S. Pat. No. 6,758,631 provides a portable screed guidance system. Mounted on the screed are inclination measuring device(s) and leveling device components(s) (e.g. laser sensor) for measuring height relative to a stationary reference laser signal positioned in the worksite. This device is not suitable for use in leveling plastic concrete in confined spaces.

U.S. Pat. No. 6,089,787 Allen et al. provides a mechanical vibrating portable screed having laser sensors positioned on the screed. The screed derives elevation information from a remote laser, in response to which the gradient may be adjusted automatically or by the screed operator. This screed is bulky and does not provide a means for screeding on slopes of varying degrees or in small areas.

Plastic concrete can be screeded through the use of concrete elevation pins placed throughout the surface where concrete is to be poured. Screeding off elevation pins can be problematic in that costly time can be lost in correctly placing and re-adjusting the pins. Moreover, conventional laser systems provide only horizontal measurements and are not useful where screeding sloped concrete surfaces is required.

There is a need for a concrete-leveling system that can be used in small spaces and that is easy to control and comfortable to maneuver. The use of traditional hand screeds, having no handles or handles of rectangular shape, results in hand and finger injury, in missed work due to injury and in poor workmanship due to fatigue from using the traditional screed board.

It is, therefore, desirable to have a concrete-leveling system that overcomes the shortcomings of the prior art and the problems discussed above.

SUMMARY OF THE INVENTION

The present invention is a system for leveling freshly poured concrete while it is in a plastic or malleable state. The system comprises a hand screed that is used in combination with a hand float that acts as a reference point for the hand screed. A reference level signal transmitter on one of the hand screed and the hand float whereas a reference level signal receiver is mounted on the other of the hand screed and the hand float. For the purposes of this specification and the claims that follow, the term "hand float" shall mean to include any device that can act as a reference point for the hand screed and can include a hand trowel or a shortened or smaller version of the hand screed.

In a representative embodiment of the present invention, the transmitter is a laser mounted on the hand screed that produces a visible light beam. The transmitter may be built into the hand screed, such that the light beam projects from one end of the hand screed, or it may be mounted on top of the hand screed with a turret that allows the transmitter to rotate about an axis that is perpendicular to the horizontal axis of the hand screed. A thumbscrew on the turret allows the user to set the azimuth of the transmitter to be adjusted to a preset angle.

In a representative embodiment, the receiver is a set of cross hairs mounted on the hand float. In its basic form, a concrete installer places the hand float at a location in work site where it acts as a reference point. The installer then screeds the plastic concrete with the hand screed, maneuvering the hand screed so that the light beam from the transmitter lines up with the cross hairs on the hand float. In alternate embodiments of the present invention, both the hand screed and hand float have bubble levels mounted on them to aid the installer in placing both the hand float and hand screed in a level position. Furthermore, the hand screed may also comprise an inclinometer that is a device that adjusts the angle of a bubble level on the inclinometer that allows an installer to work the hand screed on a desired angle for sloped concrete surfaces.

It is an object of the present invention to provide a plastic concrete-leveling system for guiding the screed operator in manually directing the hand screed while screeding concrete.

It is another object of the present invention to provide a means for indicating the level of the screed relative to the signal receiver located on the hand float.

It is another object of the present invention to provide a level measuring system wherein the signal transmitter and inclinometer are mounted on the hand screed and the reference level signal receiver is mounted on the hand float.

It is another object of the present invention to provide a hand float with a reference level signal receiver that acts as a level guide marker for a hand screed.

It is another object of the present invention to provide a means of using a laser beam leveling system consisting of a laser beam transmitter and an inclinometer, both mounted on a hand screed, and a laser beam receiver, mounted on a hand float, to guide the screed operator in manually directing the hand screed while screeding on either a horizontal or sloped concrete surface.

It is another object of the present invention to provide a hand screed with attached bubble levelers to provide greater convenience and accuracy to the screed operator in measuring the level of the screed.

It is another object of the present invention to provide a hand float with attached bubble levelers for use in leveling the hand float when the hand float, with attached level signal receiver, is being used as a portable screed level guide marker.

Broadly stated, one aspect of the present invention is a plastic concrete leveling system, comprising: a hand screed having a longitudinal axis extending therethrough; a hand float; a reference level signal transmitter operatively attached to one of said hand screed and said hand float; and a reference level signal receiver operatively attached to the other of said hand screed and said hand float.

Broadly stated, another aspect of the invention is a hand screed for use with a plastic concrete leveling system having a reference level signal receiver, comprising: a generally horizontal handle defining a longitudinal axis extending therethrough, said handle having top and bottom surfaces; a screed plate operatively attached to said bottom surface; and a reference level signal transmitter operatively attached to said handle whereby said transmitter is capable of producing a reference level signal.

Broadly stated, yet another aspect of the present invention is a hand float for use with a plastic concrete leveling system having a reference level signal transmitter, comprising: a substantially flat float board having top and bottom surfaces; a handle operatively attached to said top surface; and a reference level signal receiver operatively attached to said hand float whereby said receiver is capable of receiving a reference level signal.

BRIEF DESCRIPTION OF THE DRAWINGS

FIG. 1 is an elevational side view of the hand screed of a representative embodiment of the present invention with the laser mounted at one end of the hand screed.

FIG. 2 is a top plan view of the hand screed of a representative embodiment of the present invention with the laser of FIG. 1 removed.

FIG. 7B is a perspective view of an alternate embodiment of the present invention depicting a moveable laser mounting clamp.

FIG. 7C is a side elevational view of the laser mounting clamp of FIG. 7B.

FIG. 10 is a perspective view of the hand screed and the hand float of a representative embodiment of the present invention in operation on a sloped surface.

FIG. 11A is an elevational side view of the inclinometer of a representative embodiment of the present invention set to a preset angle.

FIG. 11B is a perspective view of the inclinometer of a representative embodiment of the present invention in its retracted position.

FIG. 12 is a perspective view of a first alternate hand grip attachment for the hand screed of a representative embodiment of the present invention.

DETAILED DESCRIPTION OF THE EMBODIMENTS

Figure 3:
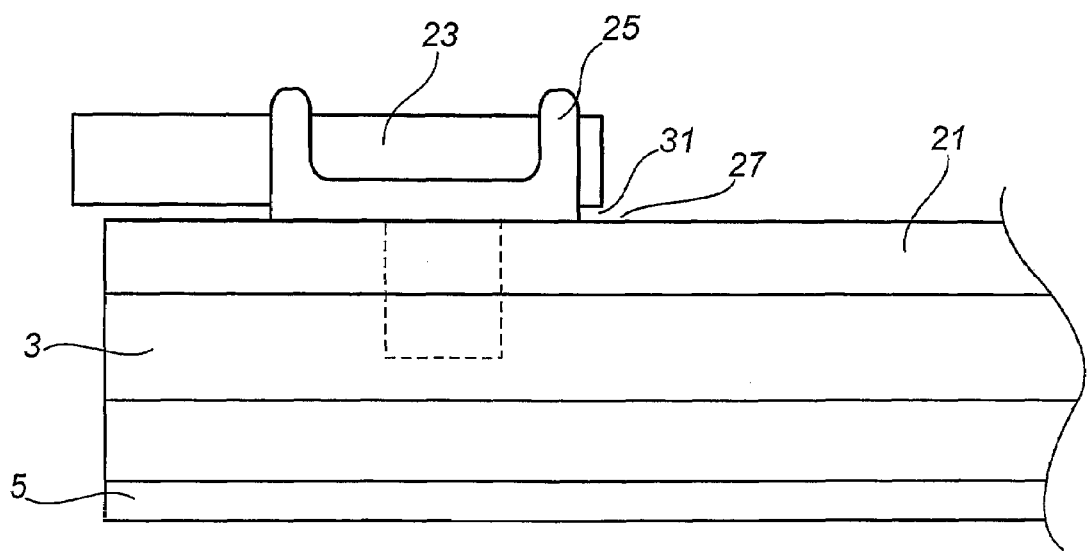
FIG. 3 is a magnified elevational side view of the laser transmitter mounted on the hand screed of a representative embodiment of the present invention.

The present invention is illustrated in the attached FIGS. 1 through 13. Referring to FIGS. 1, 2 and 3, hand screed component 1 consists of handle 3, screed plate 5, inclinometer 19, laser 23 and turret 25. Laser 23 is a visible light laser that is readily available in the construction industry, as well known by those skilled in the art. Mounted on top of handle 3 are bubble levels 9 that are rigidly positioned, one lengthwise and two widthwise, on the upper surface of handle 3 for easy visibility and to ensure accurate and convenient leveling of hand screed 1. Located on top of handle 3 are watertight compartments 17 and 21 to store inclinometer 19 and laser 23 when hand screed 1 is not in use. Also located on top of handle 3 is mounting pad 27 which comprises mounting hole 33 and pin holes 29 for mounting turret 25 on hand screed 1.

Figure 5:
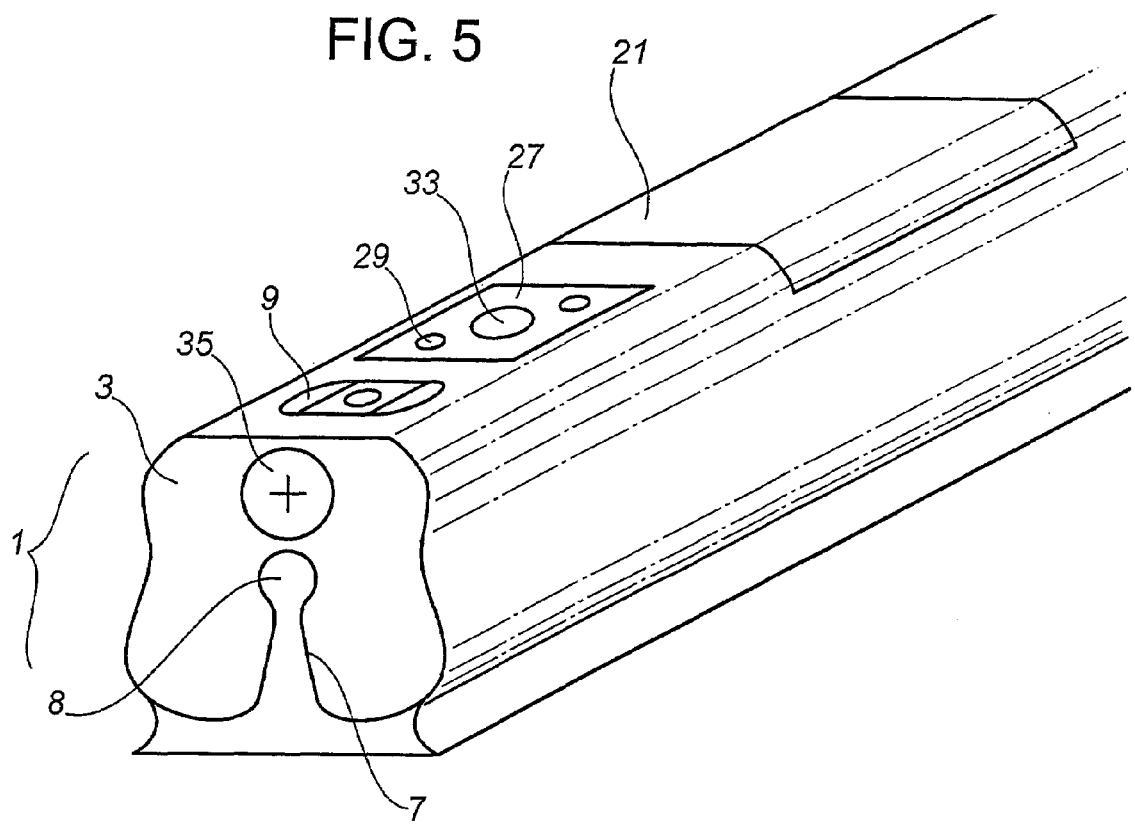
FIG. 5 is a magnified perspective view of the hand screed of an alternate embodiment of the present invention.
Figure 4:
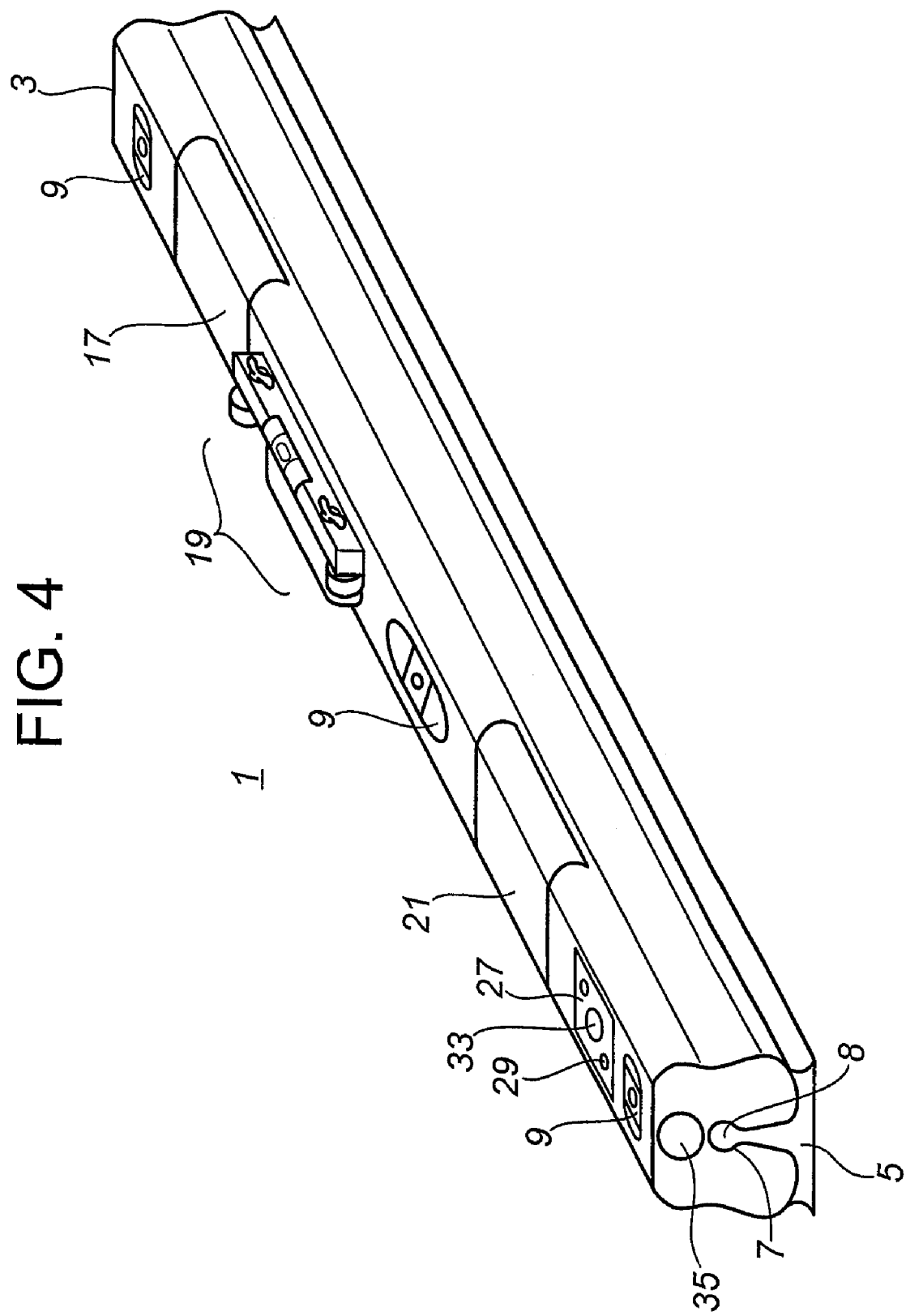
FIG. 4 is a perspective view of the hand screed of an alternate embodiment of the present invention.

Referring to FIGS. 4 and 5, an alternate embodiment of hand screed 1 is shown. In this embodiment, laser 23 is mounted within handle 3 at one end. Aperture 35 located on the end of handle 3 allows light from laser 23 to emit from hand screed 1. In both of the embodiments described above, handle 3 comprises groove 7 that runs lengthwise along the bottom of handle 3. Groove 7 is adapted for slidably engaging screed plate 5. Screed plate 5 has an inverted T-shape comprising ridge 8 for sliding into groove 7. The bottom of screed plate 5 has a flat surface for resting upon the concrete and for smoothing the concrete when hand screed 1 is drawn across the surface of the concrete. Screed plate 5 is, preferably, made from a composite plastic suitable for screeding plastic concrete, as well known to those skilled in the art.

Handle 3 is grasped by an operator to pull hand screed 1 over the plastic concrete. As hand screed 1 is manually drawn through the plastic concrete, it strikes off and levels the surface, to yield an area of uniform flatness and gradient.

Figure 6A:
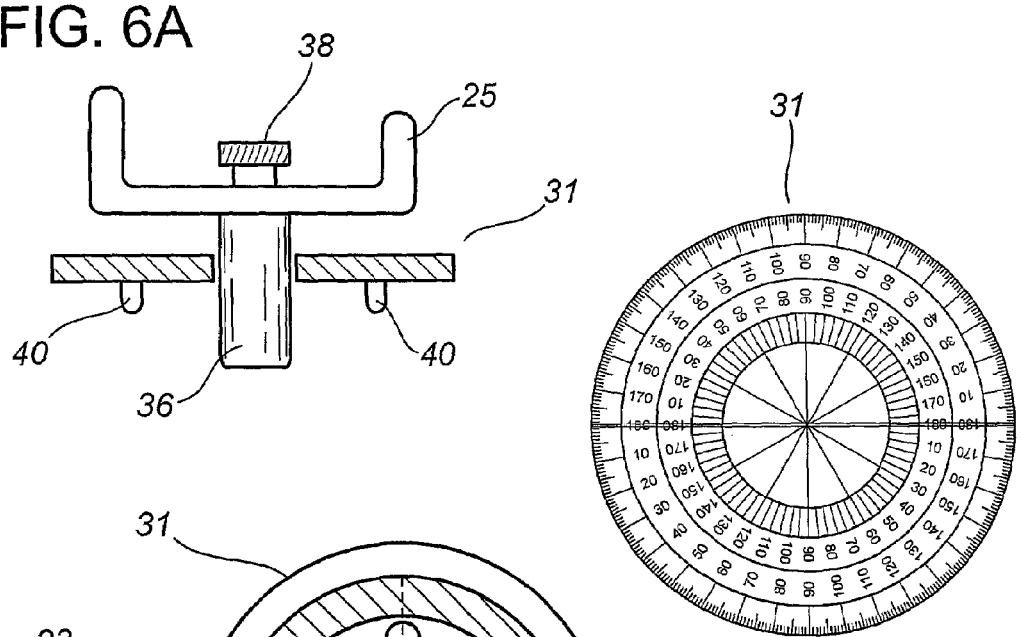
FIG. 6A is an elevational side view of the degree plate and turret of a representative embodiment of the present invention.
Figure 6C:
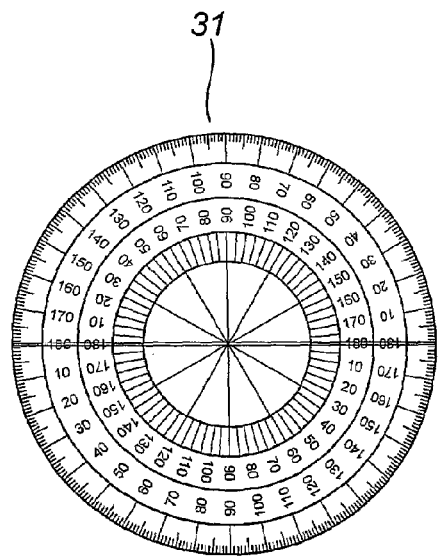
FIG. 6C is a top plan view of the degree plate of a representative embodiment of the present invention.
Figure 6B:
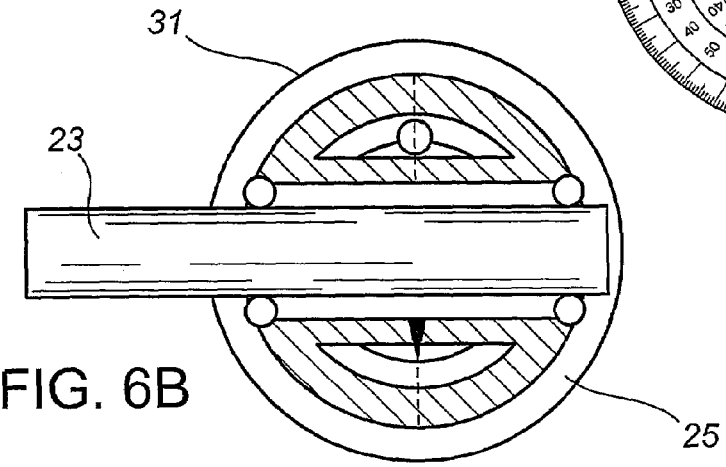
FIG. 6B is a top plan view of the laser and turret of a representative embodiment of the present invention.
Figure 7A:
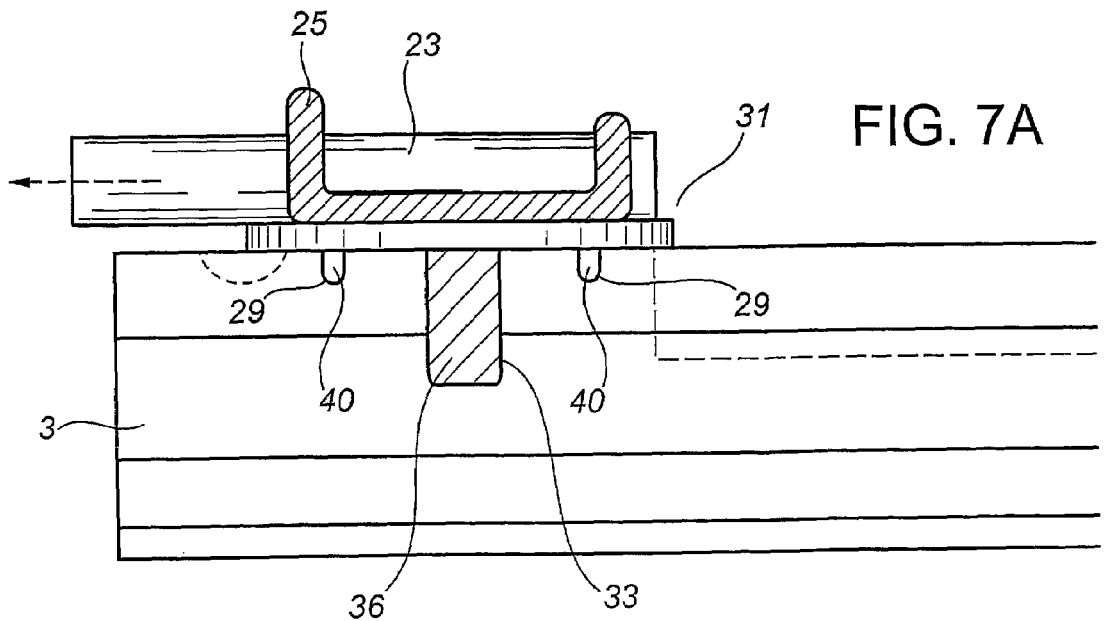
FIG. 7A is an elevational side view of the laser mounted on the hand screed of a representative embodiment of the present invention.

Referring to FIGS. 1, 2 and 3, laser 23 is removably positioned in turret 25 that, in turn, is removably mounted on mounting pad 27. Referring to FIGS. 6A, B, C and FIG. 7A, turret 25 comprises member 36 that snugly fits into hole 33 located on mounting pad 27. Turret 25 further comprises thumbscrew 38 and azimuth plate 31 for setting the azimuth angle of laser 23 relative to hand screed 1 when laser 23 is mounted on top of mounting pad 27. Azimuth plate 31 is mounted on mounting pad 27 and held in position via pins 40 that fit into pinholes 29.

Referring to FIGS. 7B and 7C, an alternate mounting system for laser 23 is shown. In this embodiment, laser 23 (not shown) is operatively attached to turret plate 70 that is secured to fixed plate 64 by threading bolt 72 into threaded hole 68. Plate 64 further comprises key 66 that slides into keyway 62 disposed on clamp mounting plate 60. Clamp mounting plate 60 is affixed on top of sliding clamp 56 that is adapted to slide along top rail 4 of handle 3. Tightening thumbscrew 58 secures clamp 56 to handle 3. With this arrangement, clamp 56 can be positioned at any location along handle 3 that is the most efficient and practical for the installer.

Figure 8:
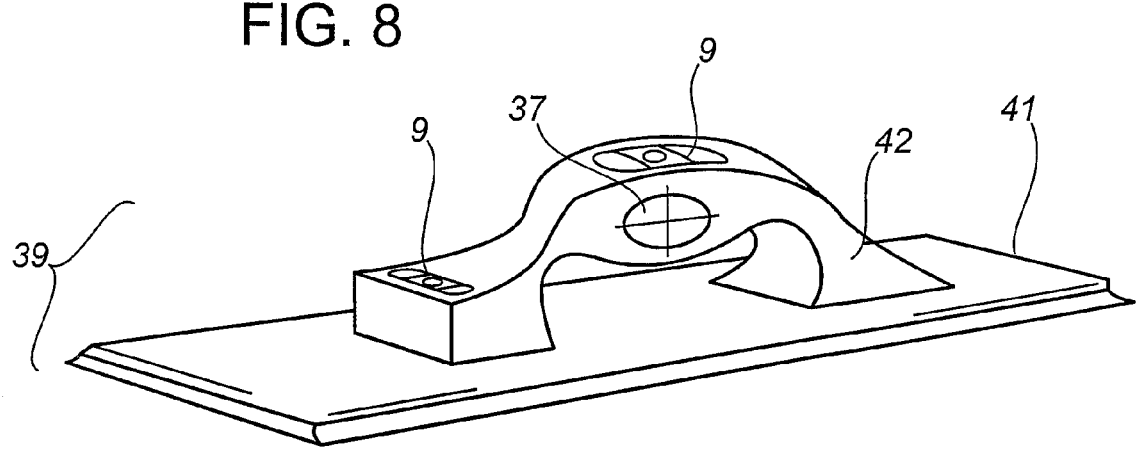
FIG. 8 is a perspective view of the hand float of a representative embodiment of the present invention.
Figure 9:
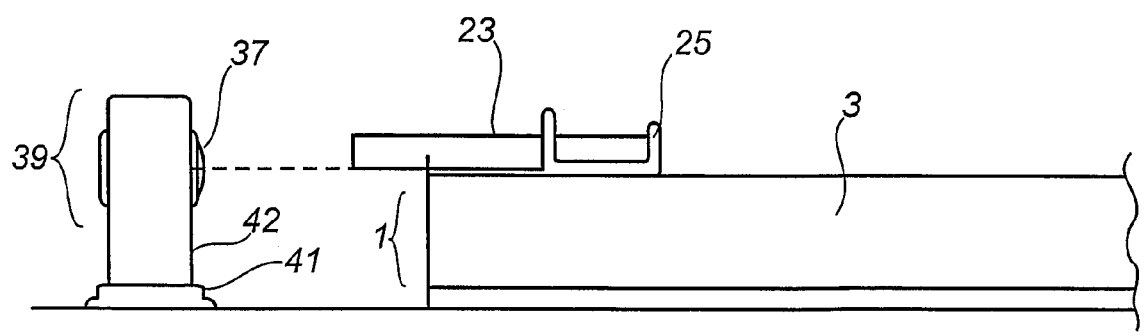
FIG. 9 is an elevational side view of the hand screed and the hand float of a representative embodiment of the present invention in operation on a horizontal surface.

Referring to FIGS. 8 and 9, hand screed 1 can be guided on a horizontal surface using laser 23 and cross hair target 37 located on hand float 39. Hand float 39 comprises float board 41 and handle 42 mounted thereon. At least two bubble levelers 9 are rigidly attached to handle 42 that allow the hand float 39 to be leveled side-to-side and front-to-back. Preferably, bubble levelers 9 are embedded in handle 42. Laser receiver 37 is, preferably, rigidly attached to or embedded on at least one side of handle 42.

Bubble levelers 9 on the hand float 39 in combination with the laser system allow hand float 39 to serve as a portable and stable level guide post. Target 37 has embedded cross hairs to assist the line of sight alignment of the light beam between laser 23 and target 37.

Before commencing screeding, hand screed 1 is placed on the plastic concrete. Hand float 39 is placed in a desired reference location. Target 37 is adjusted to receive the light beam from laser 23 such that the elevation of hand screed 1 can be manually adjusted while the plastic concrete is screeded via line of sight alignment of laser 23 and target 37, without requiring constant interruption to manually determine the level of the concrete surface.

Referring to FIGS. 10, 11A and 11B, handle 3 further supports inclinometer 19 releasably mounted thereon. In one embodiment, inclinometer 19 may be an electronic inclinometer. In another embodiment, inclinometer 19 comprises members 47 and 49. Bubble level 9 is imbedded lengthwise in member 47. Member 49 has gradient markings to indicate units of inclination such as degrees. Thumbscrew 51 threadably attaches member 47 to member 49 and can be adjustably positioned along the central hole that spans the length of member 49. Thumbscrews 51 can be tightened to temporarily lock inclinometer 19 at a given angle. Members 47 and 49 attach to pivot joints 53. In one embodiment, pivot joints 53 are removably attached to the upper surface of handle 3 by magnet 54 so that inclinometer 19 can be stored in compartment 17 when hand screed 1 is not in use.

The angle of inclinometer 19 can be adjusted for use of hand screed 1 on a sloped surface such that when hand screed 1 is positioned on a slope, inclinometer 19 can be used to measure the degree of the slope relative to horizontal. Inclinometer 19 is used for maintaining the angle of hand screed 1. So long as the degree of the slope relative to horizontal remains constant while screeding, the angle of the concrete slope will be uniform. Use of inclinometer 19 in combination with laser 23 and target 37 allows the operator screeding on an incline to ensure that the slope is of uniform angle and of uniform elevation at that angle.

In one embodiment, hand screed 1, laser 23 and inclinometer 19 are made of lightweight materials such that an operator may physically raise and lower hand screed 1 while working the concrete in order to maintain alignment of laser 23 with target 37.

In an alternative embodiment, handle 3 may comprise hand support 13 having grip 12 which may be oval or round in shape as shown in FIG. 12. Grip 12 is either fixed or swivel about its center. Hand support 13 is either permanently mounted on hand screed 1 or slides onto handle 3 from one end to a desired location and secured with thumbscrew clamp 15.

Figure 13:
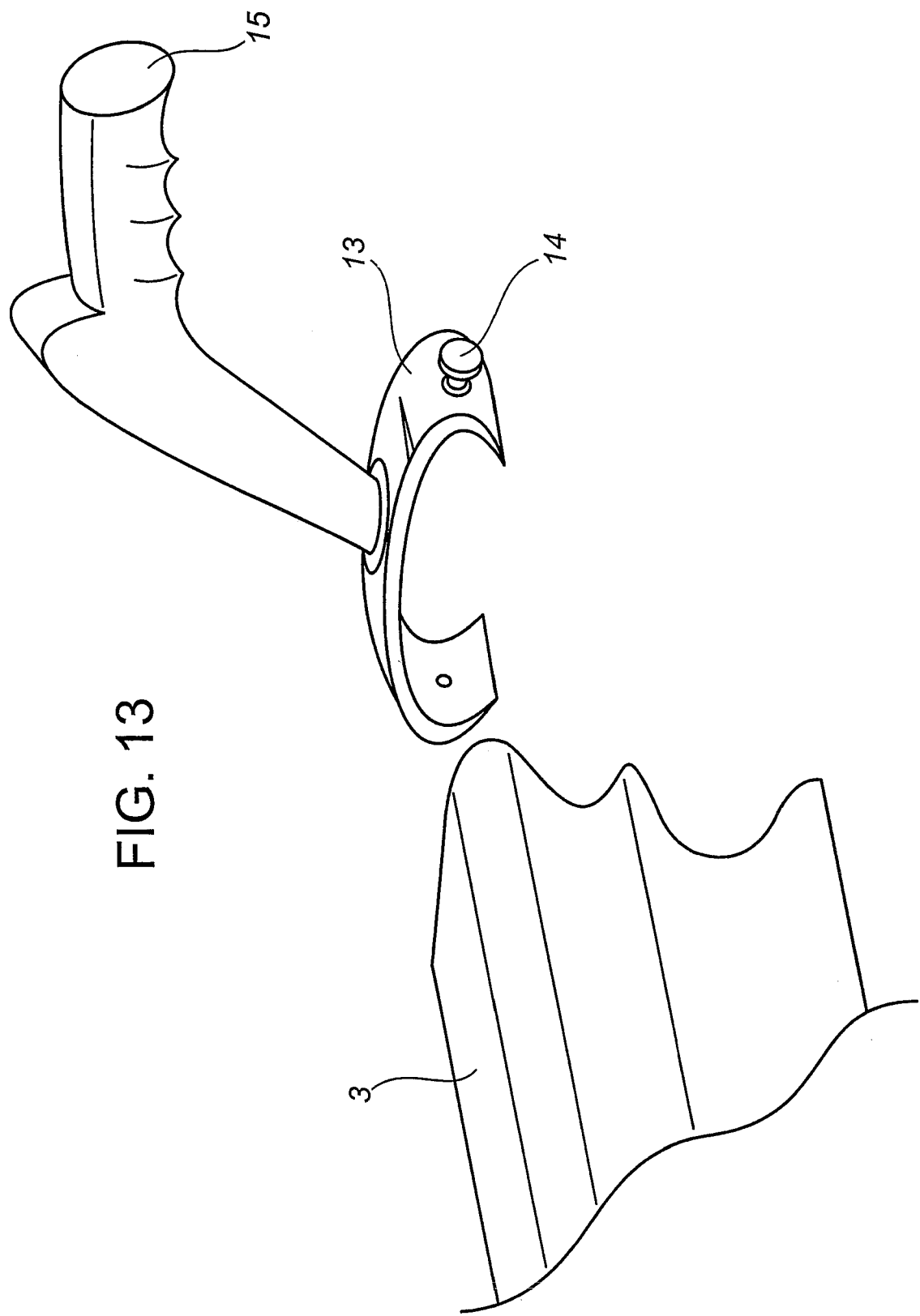
FIG. 13 is a perspective view of a second alternate hand grip attachment for the hand screed of a representative embodiment of the present invention.

In a further alternative embodiment shown in FIG. 13, hand support 13 comprises pistol grip 14 whose ergonomic shape makes operating hand screed 1 more comfortable for an operator. Pistol grip 14 is rotatably attached to the top of hand support 13. As with the previous embodiment described, hand support 13 is either permanently mounted on hand screed 1 or slides onto handle 3 from one end to a desired location and secured with thumbscrew clamp 15.

Although a few preferred embodiments have been shown and described, those skilled in the art will appreciate that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the scope of the invention is defined and limited only by the claims that follow.

I claim:

1. A plastic concrete leveling system, comprising:
    a) a hand screed having a longitudinal axis extending therethrough;
    b) a hand float;
    c) a reference level signal transmitter operatively attached to one of said hand screed and said hand float; and
    d) a reference level signal receiver operatively attached to the other of said hand screed and said hand float.

2. The system as set forth in claim 1 wherein said transmitter is operatively attached to said hand screed and said receiver is operatively attached to said hand float.

3. The system as set forth in claim 1 wherein said hand screed further comprises at least one bubble level operatively attached thereon.

4. The system as set forth in claim 1 wherein said hand float further comprises at least one bubble level operatively attached thereon.

5. The system as set forth in claim 1 wherein said hand screed further comprises an inclinometer operatively attached thereon.

6. The system as set forth in claim 5 wherein said inclinometer further comprises at least one bubble level operatively attached thereon.

7. The system as set forth in claim 2 further comprising a turret operatively disposed between said transmitter and said hand screed whereby said transmitter is capable of at least partial rotation about an axis that is substantially perpendicular to said longitudinal axis of said hand screed.

8. The system as set forth in claim 7 further comprising a moveable clamp operatively disposed between said turret and said hand screed whereby said transmitter is capable of being positioned at any location along the length of said hand screed when said moveable clamp is clamped to said hand screed.

9. The system as set forth in claim 2 wherein said transmitter is a laser that is capable of producing a visible light beam.

10. The system as set forth in claim 9 wherein said receiver is a cross-hair target capable of receiving said light beam from said transmitter.

11. A hand screed for use with a plastic concrete leveling system having a reference level signal receiver, comprising:
   a) a generally horizontal handle defining a longitudinal axis extending therethrough, said handle having top and bottom surfaces;
   b) a screed plate operatively attached to said bottom surface; and
   c) a reference level signal transmitter operatively attached to said handle whereby said transmitter is capable of producing a reference level signal.

12. The hand screed as set forth in claim 11 wherein said transmitter is a laser and said reference level signal is a visible light beam.

13. The hand screed as set forth in claim 11 wherein said transmitter is operatively attached to said top surface.

14. The hand screed as set forth in claim 13 further comprising a turret operatively disposed between said transmitter and said top surface whereby said transmitter is capable of at least partial rotation about an axis that is substantially perpendicular to said longitudinal axis.

15. The hand screed as set forth in claim 14 further comprising a moveable clamp operatively disposed between said turret and said hand screed whereby said transmitter is capable of being positioned at any location along the length of said hand screed when said moveable clamp is clamped to said hand screed.

16. The hand screed as set forth in claim 11 further comprising at least one bubble level operatively attached thereon.

17. The hand screed as set forth in claim 11 further comprising an inclinometer operatively attached thereon.

18. The hand screed as set forth in claim 17 wherein said inclinometer further comprises at least one bubble level operatively attached thereon.

19. The hand screed as set forth in claim 11 wherein said screed plate is slidably attached to said handle.

20. The hand screed as set forth in claim 11 wherein said handle further comprises at least one handgrip extending upwards therefrom.

21. The hand screed as set forth in claim 20 wherein said at least one handgrip comprises a pistol grip shape.

22. A hand float for use with a plastic concrete leveling system having a reference level signal transmitter, comprising:
   a) a substantially flat float board having top and bottom surfaces;
   b) a handle operatively attached to said top surface; and
   c) a reference level signal receiver operatively attached to said hand float whereby said receiver is capable of receiving a reference level signal.

23. The hand float as set forth in claim 22 wherein said receiver is a cross-hair target capable of receiving a visible light beam as said reference level signal.

24. The hand float as set forth in claim 22 further comprising at least one bubble level operatively attached thereon.

* * * * *